(12) United States Patent
Spinelli

(10) Patent No.: US 11,846,388 B2
(45) Date of Patent: Dec. 19, 2023

(54) SLIDE AND GLIDE DRUM MOUNTING SYSTEM

(71) Applicant: John Spinelli, Pinellas Park, FL (US)

(72) Inventor: John Spinelli, Pinellas Park, FL (US)

(*) Notice: Subject to any disclaimer, the term of this patent is extended or adjusted under 35 U.S.C. 154(b) by 359 days.

(21) Appl. No.: 17/203,013

(22) Filed: Mar. 16, 2021

(65) Prior Publication Data
US 2021/0285598 A1 Sep. 16, 2021

Related U.S. Application Data

(60) Provisional application No. 62/990,065, filed on Mar. 16, 2020.

(51) Int. Cl.
*G10D 13/18* (2020.01)
*F16M 13/02* (2006.01)

(52) U.S. Cl.
CPC ........... *F16M 13/022* (2013.01); *G10D 13/18* (2020.02)

(58) Field of Classification Search
CPC ........ G10D 13/28; G10D 13/02; G10D 13/18; G10G 5/005; F16M 13/022; F16M 13/02
USPC ........................... 248/219.4; 84/415; 403/345
See application file for complete search history.

(56) References Cited

U.S. PATENT DOCUMENTS

| | | | | |
|---|---|---|---|---|
| 5,703,306 A * | 12/1997 | Liao | ........................ | G10D 13/06 248/229.11 |
| 6,846,978 B2 * | 1/2005 | Dorfman | ................. | G10D 13/02 84/411 R |
| 9,966,050 B2 * | 5/2018 | Krol | ......................... | G10D 13/06 |
| 11,538,448 B1 * | 12/2022 | Antoun | .................... | G10G 5/005 |
| 11,646,004 B2 * | 5/2023 | Spinelli | .................. | G10D 13/18 84/415 |
| 2021/0287637 A1 * | 9/2021 | Spinelli | .................. | G10D 13/18 |

* cited by examiner

Primary Examiner — Todd M Epps
(74) Attorney, Agent, or Firm — Lewellyn Law, PLLC; Stephen Lewellyn

(57) ABSTRACT

A slide and glide drum mount system has a first coupling that is configured for removable, fixed attachment to a support post. The first coupling has a stub extending outwardly from a surface of the first coupling. A second coupling that is configured for removable, fixed attachment to a drum. The second coupling having a hole through a surface of the second coupling. The first coupling and the second coupling are removably and slidably connected with the stub disposed in the hole and with the surface of the first coupling and the surface of the second coupling engaged in contact, thereby mounting the drum to support post.

12 Claims, 2 Drawing Sheets

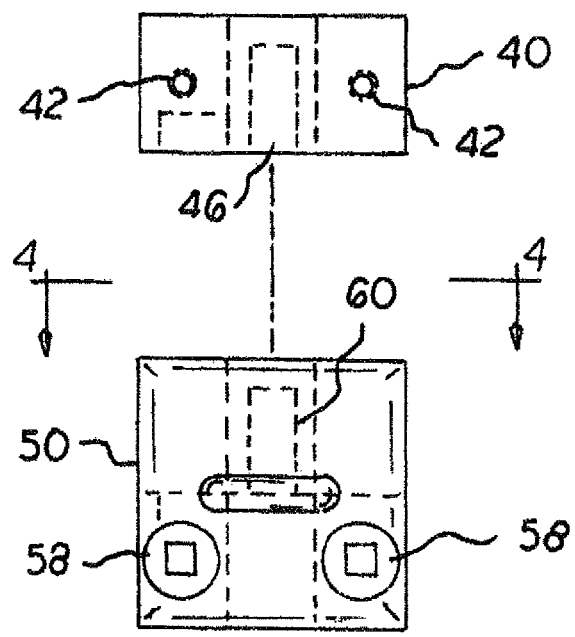
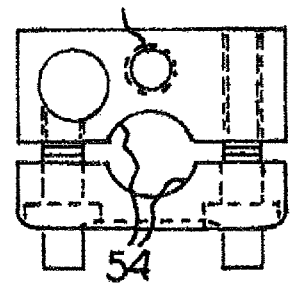
FIG. 4
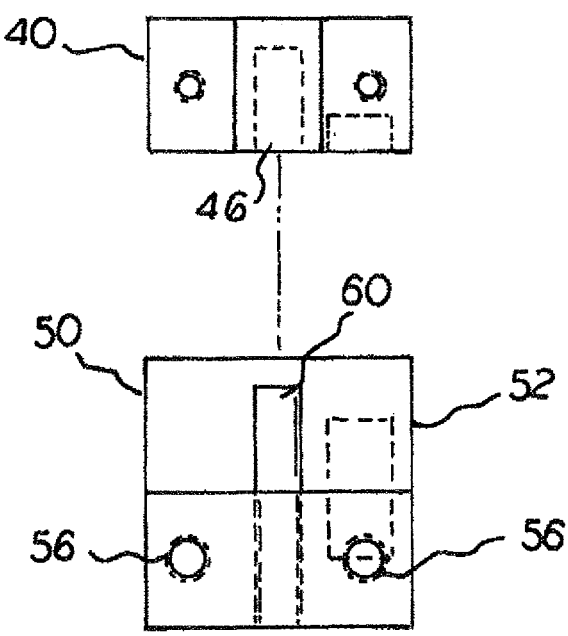
FIG. 5

SLIDE AND GLIDE DRUM MOUNTING SYSTEM

CROSS-REFERENCE TO RELATED APPLICATIONS

This application claims the benefit of U.S. Provisional Patent Application Ser. No. 62/990,065, filed Mar. 16, 2020, the entirety of which is incorporated herein by reference.

FIELD OF THE INVENTION

The present invention relates to a slide and glide drum mounting system, and more particularly, pertains to separably coupling a drum with respect to a support post by a slide coupling.

BACKGROUND OF THE INVENTION

The use of drum supports is known in the prior art. More specifically, drum supports previously devised and utilized for the purpose of supporting drums are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, do not describe a slide and glide system that allows separably coupling a drum with respect to a support post.

In this respect system according to the present invention substantially departs from the conventional concepts and designs of the prior art, and in doing so provides an apparatus primarily developed for the purpose of separably coupling a drum with respect post.

Therefore, it can be appreciated that there exists a continuing need for a new and improved slide and glide system which can be used for separably coupling a drum with respect to a support post. In this regard, the present invention substantially fulfills this need.

SUMMARY OF THE INVENTION

In view of the disadvantages inherent in the known types of drum supports now present in the prior art, the present invention provides an improved slide and glide system. As such, the general purpose of the present invention, which will be described subsequently in greater detail, is to provide a new and improved slide and glide system and method which has all the advantages of the prior art and none of the disadvantages.

In this respect, before explaining at least one embodiment of the invention in detail, it is to be understood that the invention is not limited in its application to the details of construction and to the arrangements of the components set forth in the following description or illustrated in the drawings.

In general, in one aspect, a slide and glide drum mount system is provided. The system has a first coupling that is configured for removable, fixed attachment to a support post. The first coupling has a stub extending outwardly from a surface of the first coupling. A second coupling that is configured for removable, fixed attachment to a drum. The second coupling having a hole through a surface of the second coupling. The first coupling and the second coupling are removably and slidably connected with the stub disposed in the hole and with the surface of the first coupling and the surface of the second coupling engaged in contact, thereby mounting the drum to support post.

The invention is capable of other embodiments and of being practiced and carried out in various ways. Also, it is to be understood that the phraseology and terminology employed herein are for the purpose of descriptions and should not be regarding as limiting.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIG. 2 is an enlarged front elevational view of the L-shaped post and the drum and the coupling assembly there between;

FIG. 3 is a left side elevational view taken at line 3-3 of FIG. 2;

FIG. 4 is a plan view taken at line 4-4 of FIG. 3; and

FIG. 5 is a right-side elevational view of the components shown in FIG. 3.

DETAILED DESCRIPTION OF THE INVENTION

Figure 1:
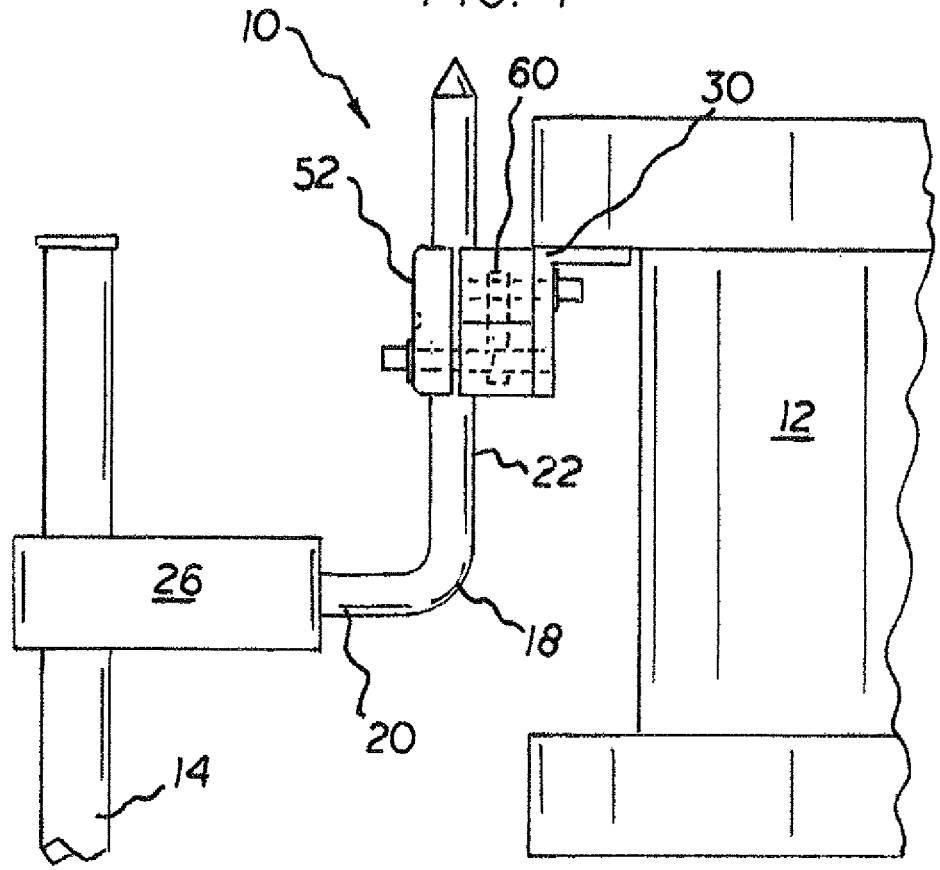
FIG. 1 is a front elevational view of a slide and guide system constructed in accordance with the principles of the present invention.
Figure 2:
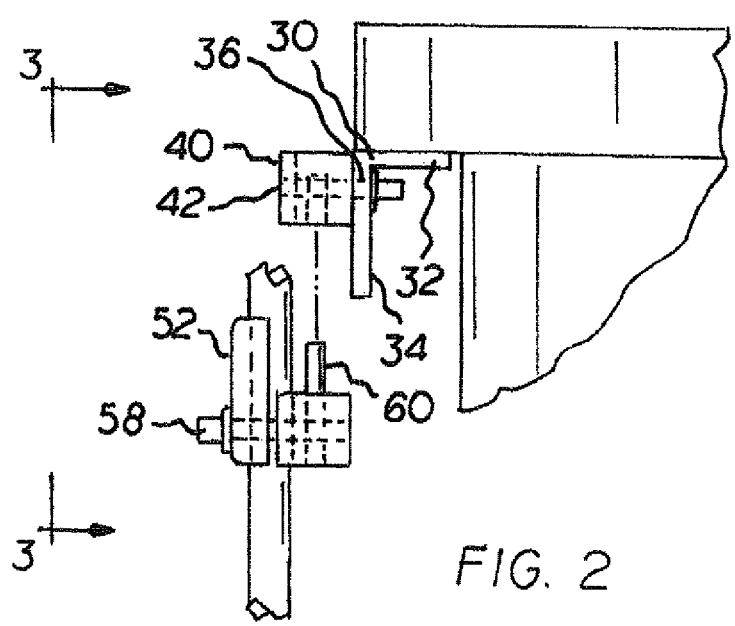

With reference now to the drawings, and in particular to FIGS. 1-5 thereof, the preferred embodiment of the new and improved slide and glide drum mount system embodying the principles and concepts of the present invention and generally designated by the reference numeral 10 will be described.

The present invention, the slide and glide drum mount system has a plurality of components. Such components are individually configured and correlated with respect to each other to attain the desired objective. In their broadest context, the invention is a slide and glide drum mount system for separably coupling a drum to a support post.

First provided is an upper block formed with two laterally spaced upper apertures and two upper bolts coupling the upper block to a drum. A vertical recess extends upwardly into the support block between the spaced apertures. Lastly provided are a mount block and logo plate with semi-cylindrical surfaces between the coupling block and the logo plat receiving a support post. Two laterally spaced lower apertures and two lower bolts couple the coupling block and the logo plate. A stub extends upwardly from the coupling block. The stub is slidably received in the recess of the upper block with the upper block in contact with a lower area of the bracket.

The present invention, from a specific viewpoint, is a slide and glide drum mount system 10 for separably coupling a drum 12 to a support post 14. The separable coupling is done in a safe, convenient, and economical manner. The system 10 includes the support post 14. The support post has a vertical orientation with a free upper end a lower end supported on a recipient surface. Next provided is an L-shaped coupling post 18 having a horizontal section 20 and a vertical section 22. Next provided is a slider 26 adjustably coupled to the support post. The slider is fixedly attached to the horizontal section 20 of the coupling post 18.

A bracket 30 in an inverted L-shaped configuration is next provided. The bracket has a horizontal region 30 attached to the drum 12 and a downwardly extending vertical region 34. Two laterally spaced upper apertures 36 are formed in the vertical region.

Provided next is an upper block 40 formed with spaced upper apertures 42 and two upper bolts 44 thready coupling the upper block to the vertical region. A vertical recess or hole 46 extends upwardly into the upper block 40 between the spaced upper apertures.

Lastly provided are a mounting block 50 and a logo plate 52. Semi-cylindrical surfaces 54 are formed between the coupling block and the logo plate receiving post. The surfaces 54 define a coupling post passage through which the coupling post extends. Two laterally spaced lower apertures 56 and two lower bolts 58 couple the coupling block and the logo plate. A stub 60 extends upwardly from the coupling block. The stub is slidably received in the recess of the upper block with the mounting block in contact with the vertical region of the bracket.

While the invention herein disclosed has been described by means of specific embodiments and applications thereof, numerous modifications and variations could be made thereto by those skilled in the art without departing from the scope of the invention set forth in the following claims.

What is claimed is:

1. A slide and glide drum mount system comprising:
   a first coupling configured for removable, fixed attachment to a support coupling post, the first coupling having a stub extending outwardly from a surface of the first coupling;
   a second coupling configured for removable, fixed attachment to a drum, the second coupling having a hole through a surface of the second coupling; and
   wherein the first coupling and the second coupling are removably and slidably connected with the stub disposed in the hole and with the surface of the first coupling and the surface of the second coupling engaged in contact.

2. The slide and glide drum mount system of claim 1, further comprising:
   a flange projecting outwardly beyond the surface of the second coupling and engaging the first coupling to prevent rotation of the first coupling relative to the second coupling about the stub.

3. The slide and glide drum mount system of claim 1, wherein:
   the first coupling has a coupling post passage through which the coupling post extends when the first coupling is attached to the coupling post.

4. The slide and glide drum mount system of claim 3, wherein:
   the first coupling includes a first member and a second member removably secured together, each of the first member and the second member defining a portion of the coupling post passage.

5. The slide and glide drum mount system of claim 4, wherein:
   the first member and the second member of the first coupling are secured together by a pair of threaded fasteners that extended through cooperating holes through each of the first and second members.

6. The slide and glide drum mount system of claim 1, further comprising:
   a support post;
   a slider adjustably coupled to the support post; and
   the coupling post connected to the slider.

7. The slide and glide drum mount system of claim 1, wherein the coupling post is L-shaped and has a vertical section and a horizontal section, and wherein the first coupling is connected to the vertical section.

8. A slide and glide drum mount system comprising:
   a support post;
   a slider adjustably coupled to the support post;
   an L-shaped coupling post having a vertical section and a horizontal section, the horizontal section connected to the slider;
   a first coupling configured for removable, fixed attachment to the vertical section of the coupling post, the first coupling having a stub extending outwardly from a surface of the first coupling;
   a second coupling configured for removable, fixed attachment to a drum, the second coupling having a hole through a surface of the second coupling; and
   wherein the first coupling and the second coupling are removably and slidably connected with the stub disposed in the hole and with the surface of the first coupling and the surface of the second coupling engaged in contact.

9. The slide and glide drum mount system of claim 8, further comprising:
   a flange projecting outwardly beyond the surface of the second coupling and engaging the first coupling to prevent rotation of the first coupling relative to the second coupling about the stub.

10. The slide and glide drum mount system of claim 8, wherein:
    the first coupling has a coupling post passage through which the coupling post extends when the first coupling is attached to the coupling post.

11. The slide and glide drum mount system of claim 10, wherein:
   the first coupling includes a first member and a second member removably secured together, each of the first member and the second member defining a portion of the coupling post passage.

12. The slide and glide drum mount system of claim 11, wherein:
   the first member and the second member of the first coupling are secured together by a pair of threaded fasteners that extended through cooperating holes through each of the first and second members.

* * * * *